United States Patent
Da Palma

(10) Patent No.: US 9,710,649 B2
(45) Date of Patent: *Jul. 18, 2017

(54) TECHNIQUES FOR PRESENTING AND COLLECTING END USER LICENSE AGREEMENT ACCEPTANCE

(75) Inventor: William V. Da Palma, Coconut Creek, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1076 days.

This patent is subject to a terminal disclaimer.

(21) Appl. No.: 13/230,388

(22) Filed: Sep. 12, 2011

(65) Prior Publication Data
US 2013/0067598 A1    Mar. 14, 2013

(51) Int. Cl.
*G06F 21/00* (2013.01)
*G06F 21/57* (2013.01)
*G06F 21/12* (2013.01)

(52) U.S. Cl.
CPC ............ *G06F 21/57* (2013.01); *G06F 21/121* (2013.01)

(58) Field of Classification Search
CPC .......... G06F 21/57; G06F 21/121; G06F 8/61; G06F 21/105; G06F 8/65; G06F 21/10; H04M 1/72525; H04L 67/34; H04L 67/22; H04W 8/245
USPC .............................................. 726/26, 27, 29
See application file for complete search history.

(56) References Cited

U.S. PATENT DOCUMENTS

| | | | |
|---|---|---|---|
| 2004/0039916 A1* | 2/2004 | Aldis et al. .................. 713/177 |
| 2006/0294515 A1* | 12/2006 | Gimpl et al. ................. 717/174 |
| 2007/0238450 A1* | 10/2007 | Hogberg ....................... 455/418 |
| 2007/0244826 A1* | 10/2007 | Wang .............................. 705/59 |
| 2008/0120192 A1* | 5/2008 | Lilly et al. ...................... 705/22 |
| 2008/0155242 A1* | 6/2008 | Beelitz et al. .................... 713/2 |
| 2009/0112771 A1 | 4/2009 | Little |
| 2009/0265180 A1 | 10/2009 | Ellison et al. |
| 2010/0074524 A1 | 3/2010 | Stollman |
| 2011/0119479 A1 | 5/2011 | Cowie et al. |

* cited by examiner

*Primary Examiner* — John B King
(74) *Attorney, Agent, or Firm* — Patterson + Sheridan, LLP

(57) ABSTRACT

Techniques are disclosed for presenting and collecting end user license agreement acceptance for software applications or firmware components executed on a computing appliance. A sentry component allows only certain commands to be executed before the relevant end user license agreements are accepted, e.g., commands to configure a network interface and web server on the appliance executed on a shell over a serial interface. Once configured the web server is used to provide a rich interface for presenting end user license agreements and obtaining acceptance thereof. Once the user accepts the terms of the relevant license agreements, then the appliance is made active and all configuration commands become operational, including commands needed to configure the device and start services which would otherwise be prohibited by the sentry component prior to license acceptance.

32 Claims, 4 Drawing Sheets

TECHNIQUES FOR PRESENTING AND COLLECTING END USER LICENSE AGREEMENT ACCEPTANCE

BACKGROUND

Embodiments of the invention are generally directed to an approach for presenting contract license agreements to users of computing appliances. More specifically, embodiments of the invention provide a variety of techniques for presenting and collecting information indicating user agreement with the terms of a licensing agreement.

Users are frequently required to indicate acceptance of an End-User License Agreements (EULA) before downloading or installing software on a computing system. Such a user may also be required to supply a license key (or other authorizing information) to activate a software application prior to its use.

Similarly, users installing, configuring, or upgrading a computing appliance may be required to accept the terms of a EULA, as such systems typically include embedded software applications made available under the terms of a EULA. For example, a hardware vendor may install and distribute their own (or third party software) as part of their hardware appliance. Computing appliance vendors would prefer to provide users with a rich interface to present and collect and end user's agreement of license terms and any license key or product activation data. For example, a vendor might wish to present license terms in the user's native language (as selected by a user) and using an easy to operate, rich user-interface that allows for printing and browsing of what are frequently large and hard-to-read agreement files. Similarly, a vendor might want to allow a user to activate and configure services using product activation data obtained via a rich user-interface.

However, computing appliances often lack the ability to provide a rich license verification interface. For example, a computing appliance may allow a user to initially boot and configure the appliance via a shell/terminal console accessed over a serial connection (e.g., a standard RS-232 connection used to send and receive ASCII formatted characters). The serial/terminal console is generally limited to presenting unformatted text in response to commands typed at a command prompt. For example, a serial console may allow a user to dump the text of a EULA to a shell window and respond to a yes/no prompt to indicate their acceptance of that license.

Other computing appliances do not provide even a serial connection. For example, some network routers have EULA terms indicating that merely by powering the equipment on, the user is automatically indicating his agreement with the documented terms (usually available on the Web, via printed material in the box or some other media).

SUMMARY

One embodiment of the invention provides a computer-implemented method for configuring a computing appliance. This method may generally include establishing an initial configuration interface to access the computing appliance, receiving one or more configuration commands via the initial configuration interface, and determining whether each of the one or more configuration commands have been authorized for execution prior to the acceptance of an end user license agreement (EULA). This method may also include executing only configuration commands determined to be authorized for execution prior to acceptance of the EULA.

In a particular embodiment, selectively executing the configuration commands based on the determination my include executing commands to configure a network interface on the computing appliance as well as executing commands to enable a web service on the computing appliance. The web service may provide a second interface for configuring the computing appliance, and wherein the web service is configured to present and collect user acceptance to the EULA.

Another embodiment includes a computer-implemented method for configuring a computing appliance. This method may generally include receiving, via an initial configuration interface, configuration settings for a network interface on the computing appliance. This method may also include establishing a connection on the computing appliance via the network interface and presenting, over the second connection, an end user license agreement (EULA). Upon receiving, over the second connection, an acceptance of the EULA, access is enabled to configuration controls for one or more services provided by the computing appliance. In a particular embodiment, the initial configuration interface provides access to a subset of configuration commands configuration commands that have been authorized for execution prior to the acceptance of the EULA.

Additional embodiments include a computer-readable storage medium storing an application, which, when executed on a processor, performs the above recited method as well as a system having a processor and a memory storing an enterprise information asset management application program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
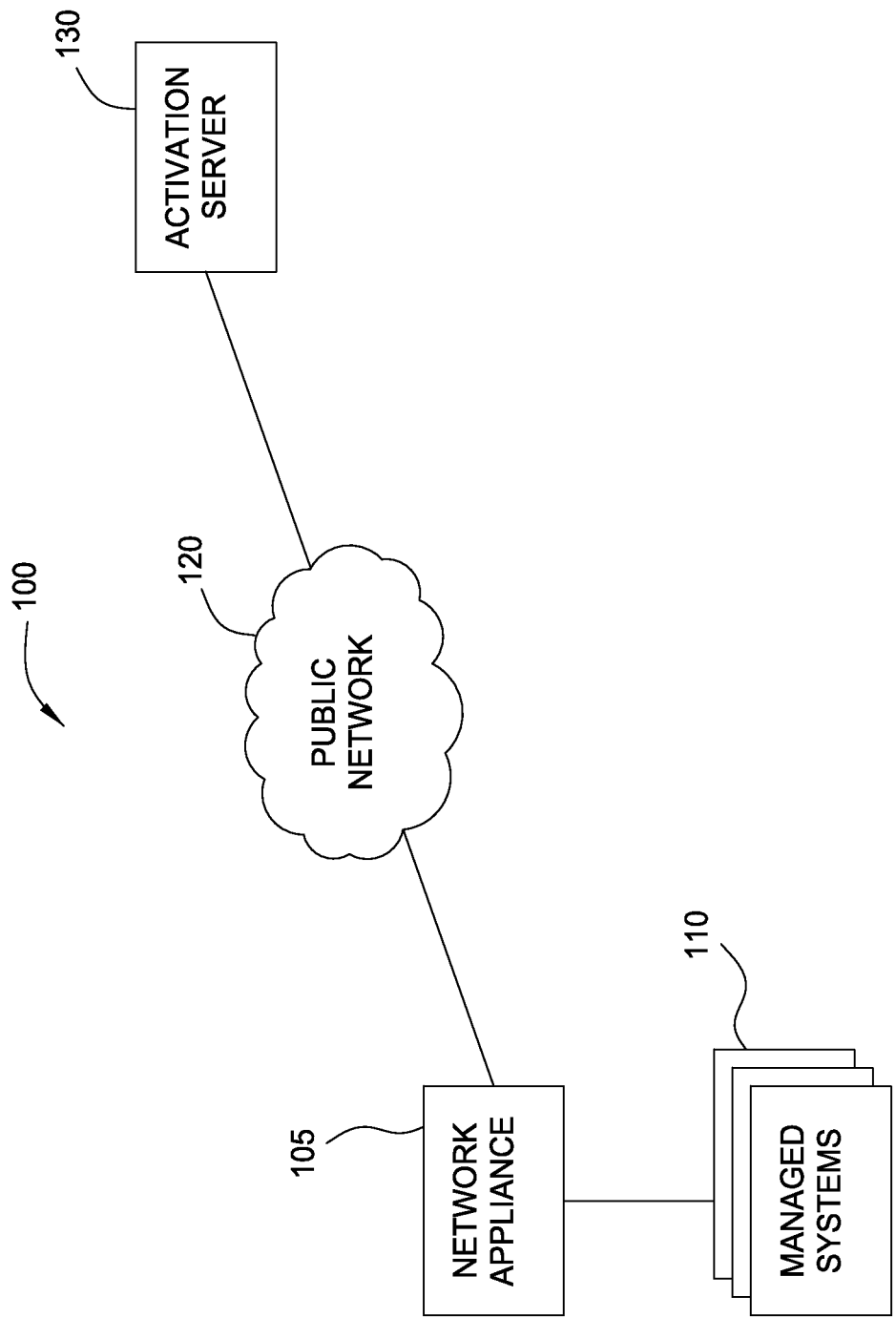
FIG. 1 illustrates an example computing infrastructure 100 used to provide a rich user interface for presenting and accepting license agreements on a network appliance, according to one embodiment of the invention

A computing appliance generally refers to computing hardware designed to provide a specific computing resource and which often resides on a dedicated hardware platform. For example, the DataPower® line of computing appliances available from International Business Machines, Inc., provide a set of XML appliances for processing XML messages as well as any-to-any legacy message transformation (flat files, text, etc.). The DataPower appliances provide network devices which use application-specific integrated circuits (ASICs) to accelerate XML processing. Computing appliances are frequently "closed," in that the appliance is not generally serviceable by the owner and provides limited access for the installation, configuration, and upgrade of software/firmware resources.

Many appliances, such as network routers, firewalls, gateways, application mediation, to name a few, as well as the DataPower appliances mentioned above, include the capabilities needed to present a rich user interface when fully configured and operational. However, such functionally may be available only after the appliance is configured and installed on a user's network. In some cases, once the appliance is configured and services are enabled, it may be too late to ask the user to agree to the terms of an end-user license agreement (EULA), as they have a already started to use the appliance (and could continue to do so without ever formally accepting the EULA terms).

Embodiments of the invention allow a user limited access to a non-configured and non-functional computing appliance. In one embodiment, a sentry component intercepts commands entered by a user to configure and enable the appliance a user (e.g., text commands typed on a shell interface established over a serial connection). The sentry component allows only certain commands to be executed before a EULA is accepted. More specifically, the sentry component ensures that the appliance is operationally disabled until the user agrees to the terms of a EULA and optionally supplies any product activation data (e.g., license keys).

If the customer declines to accept the terms of the EULA, the appliance shuts down and the customer may be requested to return it to a vendor. If the customer accepts the terms of the EULA, then the appliance is made active and all configuration commands become operational, including commands needed to configure the device and start services which would otherwise be prohibited by the sentry component prior to license acceptance.

In one embodiment, when a computing appliance is powered on for the first time, a user may attach a serial control to specify some initial configuration settings. The program servicing the serial console (e.g., a text-based shell interpreter) queries the sentry component to determine whether a given command is allowed at that time. For example, the sentry could allow the user to configure a network interface and start certain network services. Thus, the sentry could allow user to specify an IP address and other network settings for the appliance (or configure the device to use DHCP to obtain network settings) as well as start a web server executing on the appliance.

More generally, in order to establish the computing environment needed to provide a user with a rich user-interface (e.g., a web application), the sentry could allow an end user to configure the network, but prevent the user from enabling other services; namely computing services provided by the appliance and subject to the terms of a EULA. Once the network services are configured (physical and/or logical), the user may be prompted to use a web-browser to continue configuring the appliance. The graphical user-interface provided by the web server may detect the user's natural language preferences and display the EULA text in the appropriate natural language. The user can then submit the 'I Accept' request (as well as supply any licensing keys or product authorization data needed to activate the device) to the web service which responds by unlocking all the features and capabilities of the appliance.

Such a web service may be built into the appliance itself (as part of the web server providing the license terms), but the appliance may also provide license keys, or other product activation data, to a network server, which then authorizes the use of computing services provided by the appliance. In these cases, what services or capabilities of the device are enabled could depend on what product activation data is supplied by a user, based on, e.g., what services or service levels a user has purchased. Further, the rich interface allows the user to print, browse and search the EULA, which may itself be formatted using any appropriate markup, e.g., links between sections or links to the definition of a defined term within the EULA.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note, particular embodiments of the invention described below rely on an example of a computing appliance which provides network services (e.g., the service oriented architecture (SOA) XML processing services provided by the DataPower appliances available from IBM. Of course, one of ordinary skill in the art will recognize that the techniques described herein may be adapted to a broad variety of computing appliances. Accordingly, references to the specific embodiment are included to be illustrative and not limiting.

FIG. 1 illustrates an example computing infrastructure 100 used to provide a rich user interface for presenting and accepting license agreements on a network appliance, according to one embodiment of the invention. As shown, the computing infrastructure 100 includes a computing appliance 105, an activation server 130, each connected to a public network 120 (e.g., the Internet).

Additionally, the network appliance 105 is connected to a set of one or more managed systems 110. For this example, assume the network appliance 105 provides XML processing services and SOA message mediation for managed systems 110. Thus, in this example, each managed system provides a computing server with a set of applications which cooperate to provide a service (or services) to clients. For example, a data center may use a variety of systems to provide a web application to client web browsers (e.g., web servers, application servers and database systems). Or as another example, the network appliance 105 could be a network routing device used to load balance HTTP requests. In such a case, the managed systems 110 could be provide HTTP servers configured to respond to client requests for web pages hosted by such servers. Other examples of a computing appliance include network switching and routing appliances, email filtering appliance, document search appliance, network firewall appliances, network intrusion detection and monitoring appliances, network traffic acceleration appliances, hosted storage and storage area network appliances, etc.

However, regardless of the functions or services supplied by a particular computing appliance, in order to provide such services, an end user needs to configure and install the network appliance 105. Further, the end user may need to accept the terms of one or more license agreements prior to enabling the services provided by network appliance 105.

Accordingly, in one embodiment, the network appliance 105 may include a simple configuration interface accessed using a serial connection. The simple configuration interface may allow a user to enter commands needed to enable the particular services provided by the network appliance 105. Further, the network appliance 105 may include a sentry component used to monitor the commands supplied by a user via the simple configuration interface.

In one embodiment, the sentry component is configured to allow only a specified subset of commands supported by the simple configuration interface to be executed or otherwise accessed until a user has accepted the terms of one or more EULAs. For example, the sentry component may allow commands needed to configure the network settings of the appliance 105 to be executed, as well as commands which enable certain network services on the appliance, such as a web server. In such a case, once enabled, the user may connect the network appliance 105 to an Ethernet network and access the rich configuration interface using a web browser. Further, the web server may provide a web application which itself presents an EULA to the user, verifies a user's acceptance of the EULA, and obtains any product authorization data or license keys from the user, as well as allows the user to configure the services provided by the network appliance 105.

In one embodiment, the graphical user-interface provided by the web server may detect the user's language preferences and display the EULA text in the appropriate natural language. For example, an HTTP request may include an "HTTP Accept-Language header," the contents of which may be used to determine a language for a response. Once presented, the user can submit an "I Accept" request to the web service along with any licensing keys or product authorization data needed to activate the network appliance 105. If the web service is running on the network appliance 105, then web service responds by unlocking the features and capabilities of the network appliance 105.

In another embodiment, the network appliance 105 sends product activation data, license keys, etc., to the activation server 130. The activation server 130 may provide a computing system which receives the license key (or other product activation data) from the network appliance 105. In response, the activation server 130 may send a validation message to the network appliance 105 used to activate, or otherwise enable, features, functions, software, components, modules services, etc., on the network appliance 105 (provided the user supplied the correct credentials to the activation server 130).

Figure 2:
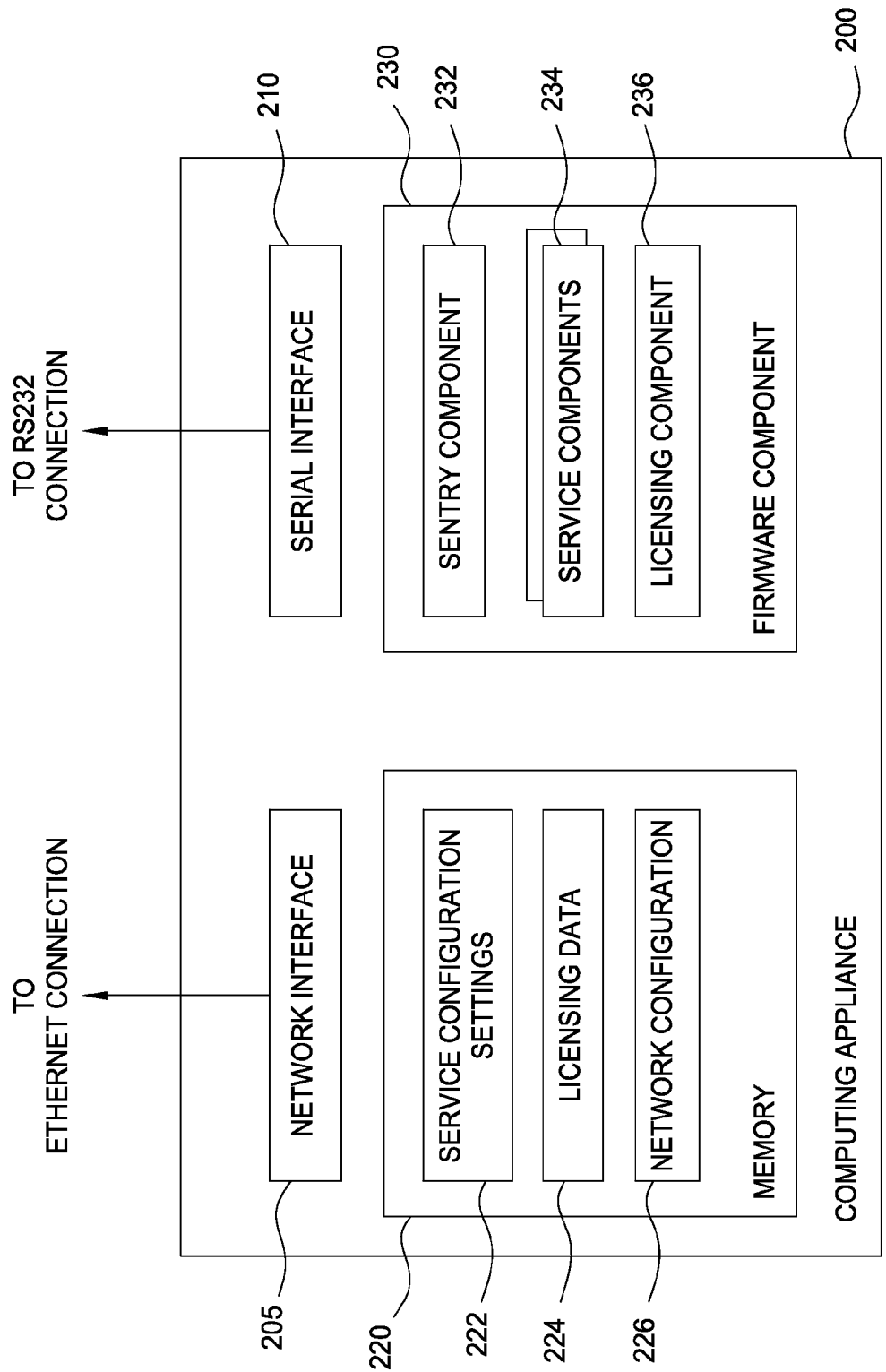
FIG. 2 illustrates an example computing appliance configured with a sentry component, according to one embodiment of the invention.

FIG. 2 illustrates an example an example computing appliance 200 configured with a sentry component 232, according to one embodiment of the invention. As shown, the computing appliance 200 includes a network interface 205, a serial interface 210, a memory 220, and a firmware component 230. The firmware component 230 provides the executable logic of the computing appliance, and the memory 220 stores application data and configuration settings used by the computing appliance 200. The firmware may include an application specific integrated circuit, FPGA, or other processing device, e.g., a CPU having one or more processing cores, etc. Memory 224 may include any combination of volatile and non-volatile memory storage elements, including DRAM, flash memory, SSD storage, or magnetic disk drives.

Illustratively, the firmware component 230 includes the sentry component 232 along with one or more service components 234 and a licensing component 236. The service components 234 generally correspond to the services, features or computing applications used provide the primary functionality of the computing appliance 200. For example, in the case of a DataPower appliance, the service components 234 are used to provide XML processing services. Other examples noted above include network routing services, firewall and intrusion detection services etc.

In addition to such "core" services provided by the computing appliance 200, service components 234 may include components which provide other ancillary services, e.g., a web server used to provide a configuration interface and a web service used to present and collect acceptance to end user license agreements (or to obtain product activation codes from an activation server). Further, the licensing component 236 may determine what features or service components 234 have been authorized for use (or for which the user has accepted the corresponding EULA), stored as licensing data 224. Depending on the licensing state, the sentry component 232 may limit what commands the user can execute to configure or enable one or more of the service components 234. Such information may be stored in the service configuration settings 222.

The serial interface 210 provides a connection used to access a console or terminal interface supported by the computing appliance 200. The serial interface 210 may provide a user with access to a simple, or initial, configuration interface, such as a command shell used to enter text commands to configure aspects of the appliance 200. As noted, the sentry component 232 may be configured to limit what commands the user may execute over using this simple configuration interface until a user has accepted the terms of one or more EULAs. For example, the sentry component may allow the user to specify network configuration settings 226, e.g., an IP address and related data, as well as enable a web service on the computing appliance 200, but prohibit the user from activating, configuring or otherwise accessing certain other service components 234.

Once the network interface 205 is configured, the user may access the computing appliance 200 using a web browser to complete the process of accepting license agreements and specifying the service configuration settings 222 for the service components 234 of the computing appliance 200. Licensing data 224 provides the text content of one or more EULA corresponding to one or more service components 234 (or other features of the computing appliance 200). Note, the licensing data 225 may include copies of each EULA in multiple languages.

However, unlike the simple interface provided by the shell console over the serial interface 20, the web server on the computing appliance 200 may provide the user with a rich, or secondary, configuration interface. The web-based interface may allow the user to view license agreements in a preferred language, as well as print, browse, and search the EULA. Additionally, the EULA may itself be formatted using any appropriate markup, e.g., links between sections or links to the definition of a defined term within the EULA. As with the serial interface 210, the sentry component 232 may be configured to prevent the user from activating, configuring or otherwise accessing certain other service components 234 using the web-based configuration interface until the user has accepted the terms of one or more EULAs.

Figure 3:
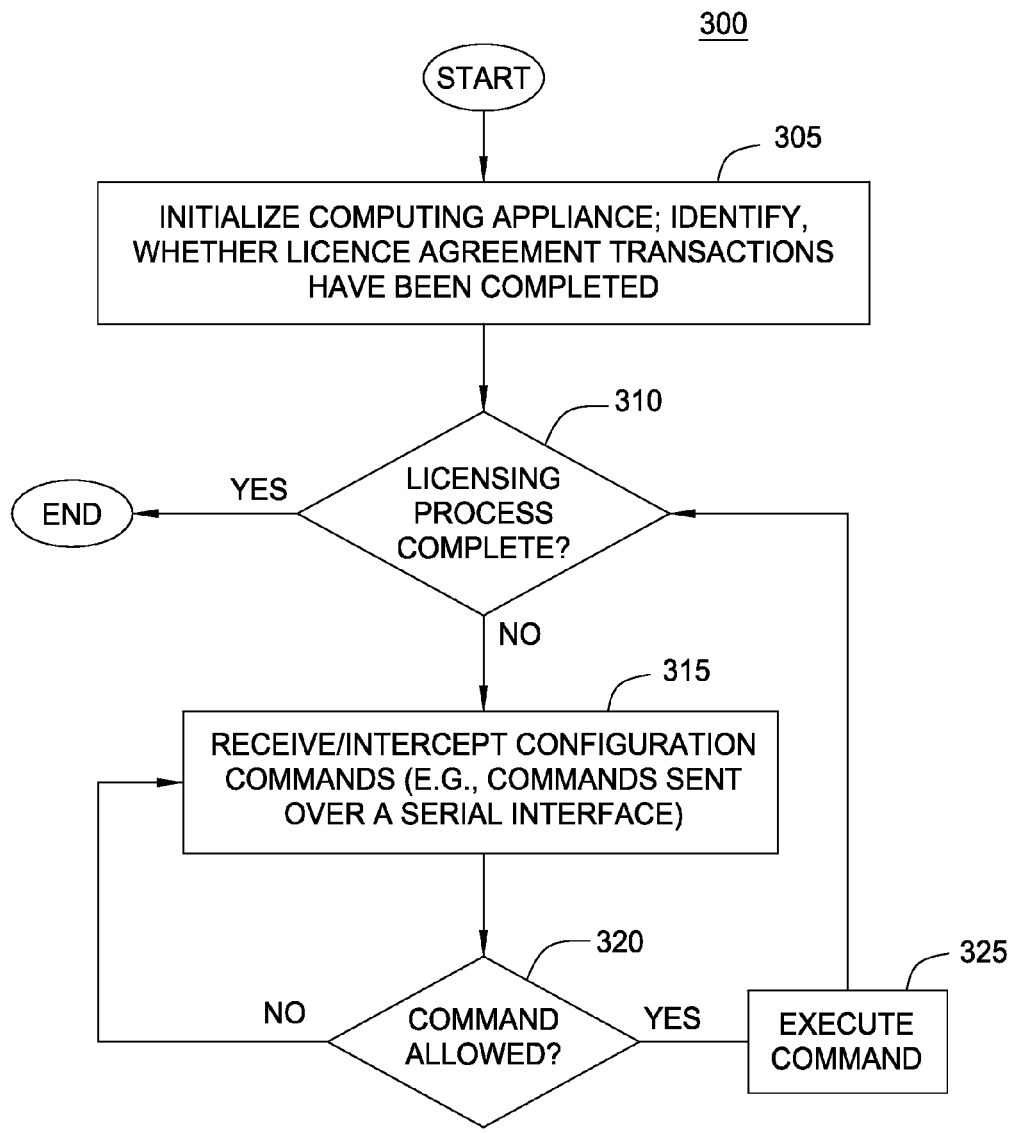
FIG. 3 illustrates a method for monitoring the use of configuration commands on a computing appliance in order to limit user access to the appliance until a licensing agreement is accepted, according to one embodiment of the invention.

FIG. 3 illustrates a method 300 for monitoring the use of configuration commands on a computing appliance in order to limit user access to that appliance until a licensing agreement is accepted, according to one embodiment of the invention. As shown, the method 300 begins at step 305, where a user powers up a computing appliance. Once powered, the computing appliance may determine whether the licensing process has been completed (step 310). If so, then the method 300 terminates, and the computing appliance functions to provide any configured services. Otherwise, if the licensing agreements have not been previously accepted (or if new components have been installed or activated that require the acceptance of an additional EULA), the computing appliance may activate (or otherwise execute) a sentry component. As noted, the sentry component may limit what commands the user may execute until a user has accepted the terms of one or more relevant EULAs.

Accordingly, at step 315 the sentry component receives or intercepts a configuration command to be executed. For example, the user may have initialized a console connection over a serial interface and enter a command in a shell prompt. In one embodiment, the shell process executed is configured to query the sentry component to determine whether the command may be executed prior to the acceptance of a relevant EULA. At step 320, the sentry component determines whether the command is allowed. If so, the command is executed at step 325. Otherwise, the command is ignored. Note, the user may be prompted with a message indicating that the command is unavailable until the licensing process has been completed. For example, assume the user is configuring the network interface on a new computing appliance. In one embodiment, the sentry component allows the user to execute the commands needed to specify a network configuration and enable a network interface on the appliance. Doing so allows the user to access the computing appliance over a network connection, as opposed to over the more limited serial interface.

Once configured the user may again access the computing appliance over the network connection to complete the licensing process as well as configure services provided by the computing appliance. For example, the user may browse to the IP address assigned to the computing device and access a web-based configuration interface available at that IP address. Such a web-based interface may present the user with rich markup versions of the license agreements as well as allow the user configure the services provided by the computing device. When the user accesses the web-based interface, the computing appliance again determines whether the license agreements have been accepted. And if such agreements have not been previously accepted (or if new components have been installed or activated that require the acceptance of an additional EULA), the sentry component continues to limit what commands the user may execute using the web-base interface until a user has accepted the terms of one or more relevant EULAs. Once the licensing process has been completed, the method 300 terminates.

Figure 4:
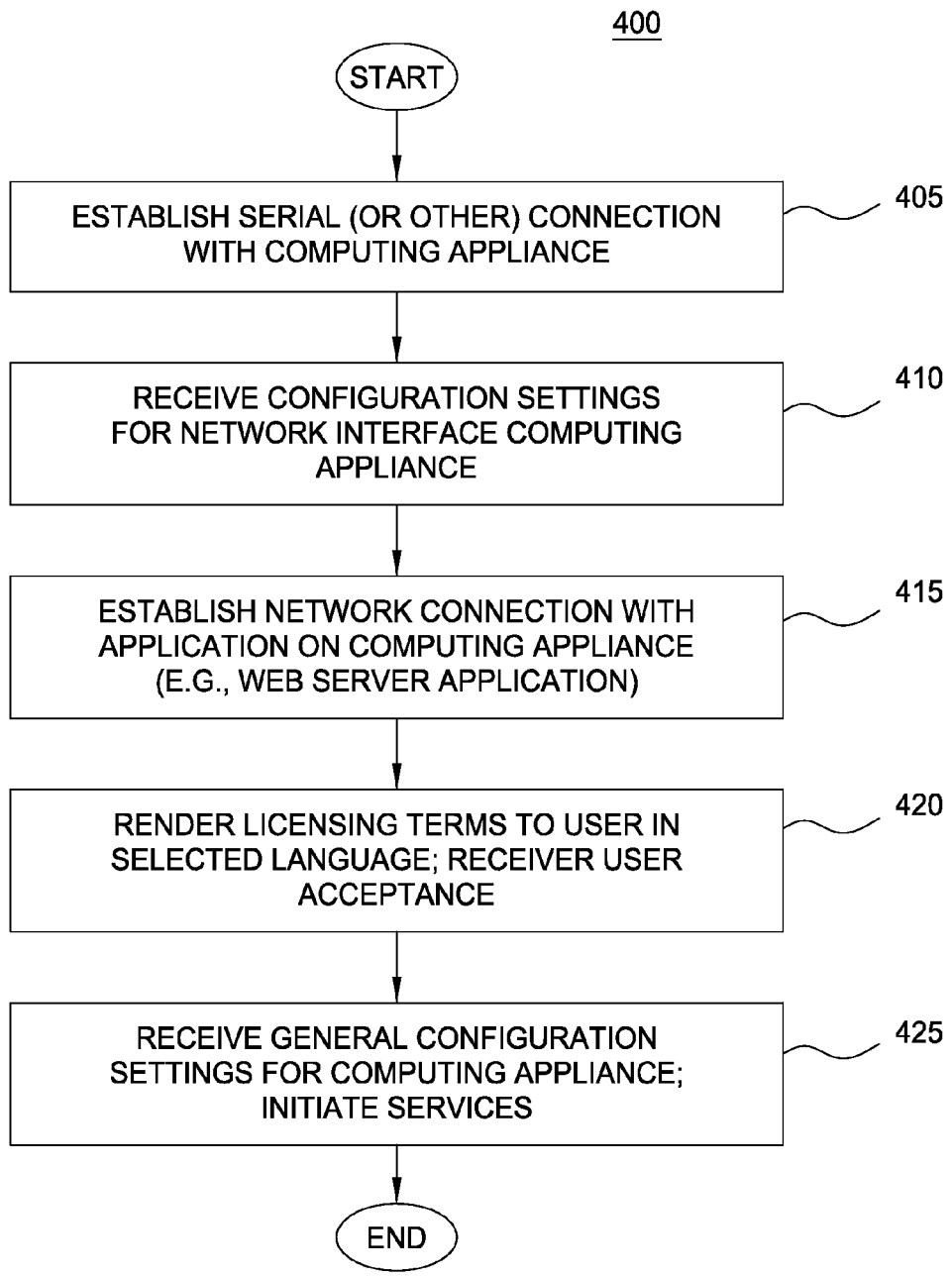
FIG. 4 illustrates a method for configuring a computing appliance to provide a rich user interface, without enabling other computing services until a licensing agreement is accepted, according to one embodiment of the invention.

FIG. 4 illustrates a method 400 for configuring a computing appliance to provide a rich user interface, without enabling other computing services until a licensing agreement is accepted, according to one embodiment of the invention. AS shown, the method 400 begins at step 405, where a user establishes a serial connection with a computing appliance. For example, the user may connect a serial cable to a terminal display in order to access a command shell on the computing appliance. At step 410, the command shell receives network configuration settings for a network interface on the computing appliance. As noted, a sentry component may intercept (or otherwise evaluate) the configuration commands supplied via shell connection and allow the network configuration settings to be made, while at the same time preventing the user from enabling or accessing other services on the computing appliance. Similarly, the sentry component may allow the user to enable a web server (or other network application) on the computing appliance.

At step 415, after configuring the network interface, the user may access the computing appliance over the network connection. For example, the user may connect the computing appliance to an Ethernet network, and using another computing system (e.g., a laptop or desktop PC), access the web server enabled on the computing appliance using the interface of the serial connection. At step 420, a web server may generate HTML markup (or retrieve static HTML pages) to be rendered by a web browser. As noted, the web-based interface may present the terms of a license agreement in a preferred language, as well introduce other useful markup elements into the terms of a EULA, including, e.g., bolded section titles, links between a table of contents and sections of the EULA, provide links to definitions, etc. The user may interact with the web-based interface to indicate their acceptance of the EULA (e.g., using button or checkbox controls rendered with the license terms).

In one embodiment, the computing appliance may be configured to request a license key (or other product authorization data) from the user. Once supplied, the computing appliance may evaluate the license data internally to determine whether a legitimate key (other product authorization data) has been provided. Alternatively, the computing appliance may use the network interface configured using the serial interface to communicate with an external licensing server. In either case, the sentry component may prevent the web based interface from being used to access other features or enable services on the computing appliance until the appropriate EULAs have been accepted and any necessary license keys (or other product authorization data) have been supplied. Once this occurs, at step 425, the web server may also provide a rich interface for configuring the computing device itself. For example, any HTML presentation or content markup may be used to provide web pages representing a current configuration state of the computing appliance, provide controls for enabling network or data processing services on the computing appliance or otherwise access features or functions of the computing appliance.

Advantageously, embodiments of the invention allow a user limited access to a non-configured and non-functional computing appliance. In one embodiment, a sentry component intercepts commands used to configure and enable the appliance entered by a user (e.g., text commands typed on a shell interface established over a serial connection). The sentry component allows only certain commands to be executed before a EULA is accepted. Once the user accepts the terms of the license agreement, then the appliance is made active and all configuration commands become operational, including commands needed to configure the device and start services which would otherwise be prohibited by the sentry component prior to license acceptance.

While the foregoing is directed to embodiments of the present invention, other and further embodiments of the invention may be devised without departing from the basic scope thereof, and the scope thereof is determined by the claims that follow.

What is claimed is:

1. A computer program product for accepting an end-user license agreement (EULA), the computer program product comprising:
a non-transitory computer-readable medium having program code embodied therewith, the program code including first instructions and second instructions, the first instructions providing a first functionality subject to the EULA, the second instructions providing a second functionality not subject to the EULA, wherein the second functionality procures acceptance of the EULA while preventing execution of the first instructions until acceptance of the EULA, the second functionality including: (i) establishing a first connection on the computing appliance via a network interface configured on the computing appliance; and (ii) causing product activation via a network server, wherein the product activation is based on a product activation code received by the computing appliance via the first connection; wherein the program code, when executed by one or more computer processors, performs an operation comprising:

executing the second instructions before acceptance of the EULA, which prevents the computing appliance from executing the first instructions; and executing the second instructions after acceptance of the EULA and after successful product activation via the network server, wherein executing the second instructions permits the computing appliance to execute the first instructions.

2. The computer program product of claim 1, wherein the second instructions include one or more instructions to configure the network interface on the computing appliance.

3. The computer program product of claim 2, wherein the second instructions further include one or more instructions to enable a web service on the computing appliance.

4. The computer program product of claim 3, wherein the web service provides an interface for configuring the computing appliance, wherein the web service is configured to present and collect user acceptance to the EULA.

5. The computer program product of claim 4, wherein the acceptance of the EULA is based on input from a user, wherein the web service is configured to present the EULA in a natural language specified by a preference setting associated with the user.

6. The computer program product of claim 1, wherein the second functionality includes establishing an initial configuration interface to the computing appliance, which in turn comprises establishing a serial connection to a command shell on the computing appliance.

7. The computer program product of claim 1, wherein the second instructions are executed by the computing appliance before acceptance of the EULA, wherein the second instructions are executed by the computing appliance after acceptance of the EULA, wherein the operation further comprises executing the first instructions after acceptance of the EULA.

8. The computer program product of claim 7, wherein the first functionality subject to the EULA comprises at least one of Extended Markup Language (XML) processing functionality, network routing functionality, firewall functionality, and intrusion detection functionality.

9. The computer program product of claim 8, wherein the first functionality subject to the EULA comprises XML processing functionality, wherein the second functionality not subject to the EULA further includes enabling a web service on the computing appliance.

10. The computer program product of claim 9, wherein the web service is enabled in order to more effectively convey the EULA via the web service than conveying the EULA via a command shell presenting unformatted text.

11. The computer program product of claim 10, wherein the computing appliance includes a plurality of components including service components, a sentry component, and a licensing component;

wherein the service components include an XML processing component and a web service component.

12. The computer program product of claim 11, wherein the licensing component is configured to determine, based on purchased services and service levels, a subset of functionality authorized for use upon acceptance of the EULA;

wherein the sentry component is configured to evaluate commands received by the computing appliance in order to prevent the computing appliance from executing the first instructions before acceptance of the EULA, wherein the computing appliance is permitted to execute the first instructions only after acceptance of the EULA.

13. The computer program product of claim 12, wherein the XML processing functionality is provided at least in part by specialized XML processing hardware of the computing appliance, wherein the first functionality subject to the EULA comprises the XML processing functionality, the network routing functionality, the firewall functionality, and the intrusion detection functionality.

14. The computer program product of claim 13, wherein the acceptance of the EULA is based on input from a user, wherein the first instructions are only executed upon successful validation of a product activation code, which is provided by the user, wherein permitting the computing appliance to execute the first instructions thereby enables access to configuration controls for the first functionality subject to the EULA.

15. The computer program product of claim 14, wherein the network interface is configured based on configuration settings received via an initial configuration interface presented by the computing compliance in order to receive configuration settings for the network interface, wherein the second functionality is accessible prior to acceptance of any EULA, wherein the second functionality not subject to the EULA further includes:

establishing the first connection between the computing appliance and a client system via the configured network interface, wherein the computing appliance sends the EULA to the client system via the first connection, wherein the client system sends an indication of acceptance of the EULA to the computing appliance via the first connection, wherein the client system sends the product activation code to the computing appliance via the first connection; and establishing a second connection between the computing appliance and the network server via the configured network interface, wherein the network server receives the product activation code from the computing appliance via the computing appliance, wherein the network server sends an indication of successful validation of the product activation code to the computing appliance via the second connection.

16. A computing appliance for accepting an end-user license agreement (EULA), the computing appliance comprising:

one or more computer processors; and a memory containing a program having first instructions and second instructions, the first instructions providing a first functionality subject to the EULA, the second instructions providing a second functionality not subject to the EULA, wherein the second functionality procures acceptance of the EULA while preventing execution of the first instructions until acceptance of the EULA, the second functionality including: (i) establishing a first connection on the computing appliance via a network interface configured on the computing appliance; and (ii) causing product activation via a network server, wherein the product activation is based on a product activation code received by the computing appliance via the first connection; wherein the program, when executed by the one or more compute processors, performs an operation comprising:

executing the second instructions before acceptance of the EULA, which prevents the computing appliance from executing the first instructions; and executing the second instructions after acceptance of the EULA and after successful product activation via the network server, wherein executing the second instructions permits the computing appliance to execute the first instructions.

17. The computing appliance of claim 16, wherein the second instructions include one or more instructions to configure the network interface on the computing appliance.

18. The computing appliance of claim 17, wherein the second instructions further include one or more instructions to enable a web service on the computing appliance.

19. The computing appliance of claim 18, wherein the web service provides an interface for configuring the computing appliance, wherein the web service is configured to present and collect user acceptance to the EULA.

20. The computing appliance of claim 19, wherein the acceptance of the EULA is based on input from a user, wherein the web service is configured to present the EULA in a natural language specified by a preference setting associated with the user.

21. The computing appliance of claim 16, wherein the second functionality includes establishing an initial configuration interface to the computing appliance, which in turn comprises establishing a serial connection to a command shell on the computing appliance.

22. A computer program product for accepting an end-user license agreement (EULA), the computer program product comprising:

a non-transitory computer-readable medium having program code embodied therewith, the program code including first instructions and second instructions, the first instructions providing a first functionality subject to the EULA, the second instructions providing a second functionality not subject to the EULA, wherein the second functionality procures acceptance of the EULA while preventing execution of the first instructions until acceptance of the EULA, wherein the program code, when executed by one or more computer processors, performs an operation comprising:

prior to receiving an acceptance of the EULA, executing the second instructions in order to:

prevent the computing appliance from executing the first instructions;

provide an initial configuration interface in order to receive configuration settings for a network interface on the computing appliance;

configure the network interface based on the configuration settings;

establish a first connection on the computing appliance via the configured network interface; and present, over the first connection, the EULA;

receive, over the first connection, a product activation code; and cause product activation via a network server and based on the product activation code; and subsequent to receiving an acceptance of the EULA over the first connection, and subsequent to successful product activation via the network server, executing the second instructions in order to permit the computing appliance to execute the first instructions, thereby enabling access over the first connection to configuration controls for the first functionality subject to the EULA.

23. The computer program product of claim 22, wherein the initial configuration interface provides access to a subset of configuration commands that have been authorized for execution prior to the acceptance of the EULA.

24. The computer program product of claim 22, further comprising:

receiving, via the initial configuration interface, configuration settings for a web service on the computing appliance.

25. The computer program product of claim 24, wherein the acceptance of the EULA is based on input from a user, wherein the web service presents the EULA in a natural language specified by a preference setting associated with the user.

26. The computer program product of claim 24, wherein the product activation code is validated prior to enabling the configuration controls for the first functionality subject to the EULA.

27. The computer program product of claim 26, wherein validating the product activation code comprises:

establishing a second connection from the computing appliance to the network server via the configured network interface;

sending the product activation code to the network server over the second connection; and receiving a validation response from the network server over the second connection, the validation response indicating the product activation code is valid.

28. The computer program product of claim 22, wherein the initial configuration interface comprises a serial connection to a command shell on the computing appliance.

29. A system to accept an end-user license agreement (EULA), the system comprising:

one or more computer processors;

a memory containing a program including first instructions and second instructions, the first instructions providing a first functionality subject to the EULA, the second instructions providing a second functionality not subject to the EULA, wherein the second functionality procures acceptance of the EULA while preventing execution of the first instructions until acceptance of the EULA, wherein the program, when executed by the one or more computer processors, performs an operation comprising:

prior to receiving an acceptance of the EULA, executing the second instructions in order to:

prevent the computing appliance from executing the first instructions;

provide an initial configuration interface in order to receive configuration settings for a network interface on the computing appliance;

configure the network interface based on the configuration settings;

establish a first connection on the computing appliance via the configured network interface; and present, over the first connection, the EULA;

receive, over the first connection, a product activation code; and cause product activation via a network server and based on the product activation code; and subsequent to receiving an acceptance of the EULA over the first connection, and subsequent to successful product activation via the network server, executing the second instructions in order to permit the computing appliance to execute the first instructions, thereby enabling access over the first connection to configuration controls for the first functionality subject to the EULA.

30. The system of claim 29, wherein the first functionality subject to the EULA comprises at least one of Extended Markup Language (XML) processing functionality, network routing functionality, firewall functionality, and intrusion detection functionality.

31. A system to accept an end-user license agreement (EULA), the system comprising:

one or more computer processors;

a memory containing a program including first instructions and second instructions, the first instructions providing a first functionality subject to the EULA, the second instructions providing a second functionality not subject to the EULA, wherein the second functionality procures acceptance of the EULA while preventing execution of the first instructions until acceptance of the EULA, wherein the program, when executed by the one or more computer processors, performs an operation comprising:

prior to receiving an acceptance of the EULA, executing the second instructions in order to:

prevent the computing appliance from executing the first instructions;

provide an initial configuration interface in order to receive configuration settings for a network interface on the computing appliance, wherein the initial configuration interface comprises a serial connection to a command shell on the computing appliance;

configure the network interface based on the configuration settings;

establish a first connection on the computing appliance via the configured network interface; and present, over the first connection, the EULA; and upon receiving, over the first connection, an acceptance of the EULA:

receiving a product activation code over the first connection; and upon successful validation of the received product activation code via a network server, executing the second instructions in order to permit the computing appliance to execute the first instructions, thereby enabling access over the first connection to configuration controls for the first functionality subject to the EULA.

32. The system of claim 31, wherein the first functionality subject to the EULA comprises at least one of Extended Markup Language (XML) processing functionality, network routing functionality, firewall functionality, and intrusion detection functionality.

* * * * *